United States Patent Office 3,493,560
Patented Feb. 3, 1970

3,493,560
10,5 - (IMINOMETHANO) - 10,11 - DIHYDRO - 5H-DIBENZO[a,d]CYCLOHEPTEN - 13-ONE AND RELATED COMPOUNDS
Thomas A. Dobson, Dollard des Ormeaux, Quebec, and Martin A. Davis, Montreal, Quebec, Canada, assignors to American Home Products Corporation, New York, N.Y., a corporation of Delaware
No Drawing. Original application July 29, 1966, Ser. No. 568,745. Divided and this application Oct. 22, 1968, Ser. No. 769,721
Int. Cl. C07d 41/06, 39/00; A61k 27/00
U.S. Cl. 260—239.3                                    6 Claims

---

ABSTRACT OF THE DISCLOSURE

There are disclosed herein 10,5-(iminomethano)-10,11-dihydro-5H-dibenzo[a,d]cyclohepten-13-one and N-substituted derivatives thereof in which the substituent is a lower alkyl, an unsaturated lower alkyl, an aralkyl, a dialkylaminoalkyl, or a heterocyclicalkyl group. The compounds have trichomonicidal and anti-convulsant activities, and methods for their preparation and use are also disclosed.

---

This application is a division of our earlier-filed U.S. patent application S.N. 568,745, filed July 29, 1966.

This invention relates to novel chemical compounds having useful biological properties and to intermediates used in their preparation. In particular, this invention relates to derivatives of 10,5-(iminomethano)-10,11-dihydro-5H-dibenzo[a,d]cyclohepten-13-one of the following generic Formula I:

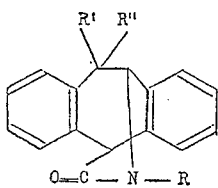

I.

wherein R resepresents hydrogen, or an organic group, such as a lower alkyl group containing from 1–4 carbon atoms, an unsaturated lower alkyl group, such as, for example, the allyl group, an aralkyl group containing from 7–10 carbon atoms such as, for example, the benzyl, phenethyl or trimethoxybenzyl groups, a dialkylaminoalkyl group containing from 4–9 carbon atoms, such as, for example, the dimethylaminoethyl, dimethylaminopropyl, or the diisopropylaminopropyl group, or a heterocyclicalkyl group containing from 5–8 carbon atoms, and from 1–2 hetero atoms, such as, for example, the pyrrolidinoethyl, the piperidinoethyl, the (N'-methylpiperazino)propyl, or the morpholinoethyl group, and R' and R" both represent hydrogen. This invention also relates to the pharmacologically acceptable salts of the basic compounds of Formula I.

The compounds of this invention are active against *Trichomonas vaginalis* and are useful as trichomonicidal agents. As such they may be formulated with suitable excipients such as, for example, starch or lactose, in the form of vaginal tablets or inserts, containing from 50–250 mg. of the active ingredients, and may be administered from one to three times per day as directed by the physician.

Some of the compounds of this invention, especially those of Formula I in which R represents hydrogen or a lower alkyl group and R' and R" both represent hydrogen, also possess anticonvulsant activity and are useful in the treatment of certain disorders associated with convulsions. As such, they may be formulated with suitable excipients in the form of tablets or capsules containing from 75–300 mg. of the active ingredient, and may be administered from one to several times per day as directed by the physician.

The compounds of Formula I in which R is as defined above and R' and R" both represent hydrogen are obtained by treating 11-bromo-10,5-(epoxymethano)-10,11-dihydro-5H-dibenzo[a,d]cyclohepten - 13 - one, obtained as described in our co-pending U.S. patent application, S.N. 539,640, filed Apr. 4, 1966, now U.S. Patent No. 3,361,767, with either ammonium hydroxide or an aqueous solution or suspension of a primary amine of formula R—NH$_2$ in which R is as defined above to give an 11-hydroxy - 10,5 - (iminomethano) - 10,11 - dihydro - 5H-dibenzo[a,d]cyclohepten-13-one of Formula II wherein R is as defined above, R' represents the hydroxyl group, and R" represents hydrogen. In their turn these compounds are subjected to hydrogenolysis by treating them with an alkali metal in either ammonia or a primary or secondary amine as solvent, preferably sodium in liquid ammonia to yield the compounds of Formula I, wherein R is as defined above, and R' and R" both represent hydrogen.

Alternatively, the same compounds may be prepared by treating 11-hydroxy-10,5-(iminomethano)-10,11-dihydro-5H-dibenzo[a,d]cyclohepten - 13 - one prepared as described above, with an organic halide of the formula R—X in which R is an organic group as defined above and X represents a halogen with an atomic weight greater than 19, in the presence of an alkali metal hydride, preferably sodium hydride to obtain the compounds of Formula II wherein R is as defined above, R' represents the hydroxyl group, and R" represents hydrogen. In their turn these compounds are hydrogenolyzed as described above, to yield the compounds of Formula I wherein R is as defined above, and R' and R" both represent hydrogen.

Alternatively, the same compounds may also be obtained by subjecting 11-hydroxy-10,5-(iminomethano)-10,11 - dihydro-5H-dibenzo[a,d]cyclohepten-13-one, prepared as described above, to hydrogenolysis by treating it with an alkali metal in either ammonia or a primary or secondary amine as described above to give 10,5-(iminomethano) - 10,11 - dihydro-5H-dibenzo-[a,d]cyclohepten-13-one of Formula I wherein R, R', and R" all represent hydrogen. In its turn, this compound may be treated with an organic halide of the formula R–X in which R is an organic group as defined above and X represents a halogen with an atomic weight greater than 19, in the presence of an alkali metal hydride, preferably sodium hydride, to obtain the compounds of Formula I in which R is as defined above, and R' and R" both represent hydrogen.

The starting materials for the compounds of this invention, viz., the 11-hydroxy-10,5-(iminomethano)-10,11-dihydro-5H-dibenzo[a,d]cyclohepten-13-ones of Formula II in which R is as defined above may be repared as described in our co-pending U.S. patent applications cited above. Briefly, this process entails the addition of one molar proportion of bromine to 5H-dibenzo[a,d]cyclohepten-5-carboxamide, prepared as described by M. A. Davis et al. in J. Med. Chem., vol 7, p. 88 (1964), dissolved in an inert solvent such as, for example, chloroform, to produce 10,11-dibromo-10,11-dihydro-5H-dibenzo[a,d]cycloheptene-5-carboxamide, which upon treatment with either boiling water or a boiling alkanol yields 11 - bromo - 10,5-(epoxymethano)-10,11-dihydro-5H-dibenzo[a,d]cyclohepten-13-one. The latter compound is treated with either ammonium hydroxide solution or an aqueous solution or a suspension of an amine of formula H$_2$NR in which R is as defined above in an autoclave at a temperature within the range of 100° C. to 150° C. to yield the 11-hydroxy-10,5-(iminomethano)-5H-dibenzo[a,d]cyclohepten-13-one of Formula II in which R is as defined above.

More specifically, the compounds of Formula I wherein R' and R" represent hydrogen and R is as defined above are prepared in the following manner. Thus, a compound of Formula II wherein R is as defined above is suspended in liquid ammonia and treated with a molar excess of sodium metal to yield, after treatment with ammonium chloride and evaporation of the solvent, the corresponding 10,5-(iminomethano)-10,11-dihydro-5H-dibenzo[a,d]cyclohepten-13-one of Formula I wherein R is as defined above.

Alternatively the same compounds may be prepared by the following general method. Thus a 10,5-iminomethano) - 10,11-dihydro-5H - dibenzo[a,d]cyclohepten-13-one of Formula I wherein R, R' and R" represent hydrogen is dissolved in an inert solvent, optionally dioxan, and treated with one molar equivalent of sodium hydride and then with one molar equivalent of an organic halide of the formula R—X, in which R is an organic group as defined above and X represents a halogen with an atomic weight greater than 19, at a temperature within the range of 50° C. to 100° C. for a period of time of up to two days, to yield, after evaporation of solvent and leaching with water, the corresponding 10,5-(iminomethano)-10,11 - dihydro-5H-dibenzo[a,d]cyclohepten-13-one of Formula I wherein R is an organic group as defined above.

The following formulae and examples will illustrate this invention:

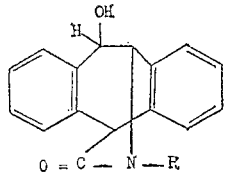

II.

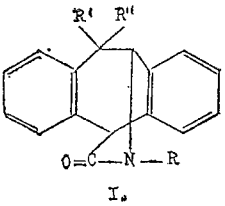

I.

EXAMPLE 1

11-hydroxy-10,5-(iminomethano)-10,11-dihydro-5H-dibenzo[a,d]cyclohepten-13-one

11 - bromo - 10,5-(epoxymethano)-10,11-dihydro-5H-dibenzo[a,d]cyclohepten-13-one (30 g.) and aqueous ammonium hydroxide solution (250 ml.; d. 0.9) are heated together at 120° C. for 4.5 hours in a rocking autoclave.

The solid product is collected and crystallized from ethanol to give the title product with M.P. 260–262° C.

EXAMPLE 2

11-hydroxy-12-methyl-10,5-(iminomethano)-10,11-dihydro-5H-dibenzo[a,d]cyclohepten-13-one 11 - bromo-10,5-(epoxymethano)-10,11-dihydro-5H-dibenzo[a,d]cyclohepten-13-one (275 g.) and methylamine (700 ml. of a 25% aqueous solution) are heated together as described in Example 1. The solid product is collected and crystallized from methanol to give the title product with M.P. 267–270° C.

Alternatively, a mixture of 11-hydroxy-10,5-(iminomethano) - 10,11 - dihydro-5H-dibenzo[a,d]cyclohepten-13-one (2.51 g.) obtained as described in Example 1, dioxan (50 ml.), sodium hydride (450 mg. of a 54% suspension) and methyliodide (1.42 g.) is refluxed for 6 hours. The mixture is evaporated to dryness, leached with water and the insoluble residue is purified from methanol to give the title product identical with that described above.

EXAMPLE 3

11 - hydroxy-12-(β-N,N-diethylaminoethyl)-10,5-(iminomethano) - 10,11 - dihydro - 5H - dibenzo[a,d]cyclohepten-13-one A mixture of 11-bromo-10,5-(epoxymethano)-10,11-dihydro - 5H - dibenzo[a,d]cyclohepten-13-one (30 g.), N,N-diethylaminoethylamine (20 g.) and water (50 ml.) are heated together as described in Example 1. The solid product is collected, washed with water and then with hexane and then crystallized from benzene-hexane to give the title product with M.P. 166–168° C.

Alternatively, a mixture of 11-hydroxy-10,5-(iminomethano) - 10,11 - dihydro-5H-dibenzo[a,d]cyclohepten-13-one (2.51 g.), prepared as described in Example 1, dioxan (50 ml.), sodium hydride (450 mg. of a 54% suspension) and β-chloroethyldiethylamine (1.36 g.) is refluxed for 6 hours. The mixture is evaporated to dryness, leached with water and the insoluble residue is crystallized from benzene-hexane to give the title product identical with that described above.

In the same manner as described in Example 1 but using ethylamine, propylamine, butylamine, allylamine, benzylamine, β - phenylethylamine trimethoxybenzylamine, dimethylaminoethylamine, dimethylaminopropylamine, diisopropylaminopropylamine, pyrrolidinoethylamine, piperidinoethylamine, (N' - methylpiperazino) propylamine or morpholinoethylamine, respectively, instead of ammonium hydroxide, methylamine or diethylaminoethylamine the following 12 - substituted - 11-hydroxy - 10,5 - (iminomethano)-10,11-dihydro-5H-dibenzo[a,d]cyclohepten-13-ones are respectively obtained: 12-ethyl-, 12-propyl-, 12-butyl-, 12-allyl-, 12-benzyl-, 12-phenethyl-, 12 - trimethoxybenzyl-, 12 - dimethylaminoethyl-, 12 - dimethylaminopropyl-, 12-diisopropylaminopropyl-, 12-pyrrolidinoethyl-, 12-piperidinoethyl-, 12-(N'-methylpiperazino)propyl-, and 12-morpholinoethyl-10,5-(iminomethano) - 10,11 - dihydro - 5H - dibenzo[a,d]cyclohepten-13-one.

Alternatively, in the same manner as described in Example 2 but using ethyl, propyl, butyl, allyl, benzyl, β-phenethyl, trimethoxybenzyl, dimethylaminoethyl, dimethylaminopropyl, diisopropylaminopropyl, pyrrolidinoethyl, piperidinoethyl, (N-methylpiperazino)propyl or morpholinoethyl chloride or bromide respectively instead of methyl iodide the above compounds are also obtained.

EXAMPLE 4

10,5-(iminomethano)-10,11,dihydro-5H-dibenzo[a,d]cyclohepten-13-one

Small pieces of sodium are added to a stirred suspension of 11 - hydroxy-10,5-(iminomethano)-10,11-dihydro-5H-dibenzo[a,d]cyclohepten-13-one (15.0 g.) prepared as described in Example 1, in liquid ammonia (200 ml.) until an excess of sodium is present. The mixture is stirred for 10 minutes and then ammonium chloride is added.

The ammonia is evaporated and the water-insoluble portion of the residue is recrystallized from chloroform-benzene to yield the title product with M.P. 242–245° C.

EXAMPLE 5

12-methyl-10,5-(iminomethano)-10,11-dihydro-5H-dibenzo[a,d]cyclohepten-13-one

11 - hydroxy - 12-methyl-10,5-(iminomethano)-10,11-dihydro-5H-dibenzo[a,d]cyclohepten-13-one (5.0 g.) is suspended in liquid ammonia (100 ml.) and treated with sodium and then with ammonium chloride as described in Example 4.

The solvent is evaporated and the residue is leached with water and the insoluble residue is crystallized from benzene to yield the title product with M.P. 256–258° C.

Alternatively, a mixture of 10,5-(iminomethano)-10,11-dihydro - 5H-dibenzo[a,d]cyclohepten-13-one (2.35 g.), prepared as described in Example 4, dioxan (30 ml.), sodium hydride (4.50 mg. of a 54% suspension) and methyl iodide (1.42 g.) is refluxed for 12 hours. The mixture is evaporated to dryness, washed with water and the insoluble residue is crystallized from benzene to give the title product identical with that described above.

In the same manner as described in Example 4, but using as starting materials 12-ethyl-, 12-propyl-, 12-butyl-, 12-allyl-, 12-benzyl-, 12-phenethyl-, 12-trimethoxybenzyl-, 12 - diisopropylaminopropyl-, 12 - pyrrolidinoethyl-, 12-piperidinoethyl-, 12-(N'-methylpiperazino)propyl-, or 12-morpholinoethyl-, 11-hydroxy-10,5-(iminomethano)-10,11-dihydro-5H-dibenzo[a,d]cyclohepten-13-one the following 12-substituted-10,5-(iminomethano)-10,11-dihydro-5H-dibenzo[a,d]cyclohepten - 13 - ones are respectively obtained: 12-ethyl-, 12-propyl-, 12-butyl-, 12-allyl-, 12-benzyl-, 12-phenethyl-, 12-trimethoxybenzyl-, 12-diisopropylaminopropyl-, 12-pyrrolidinoethyl-, 12-piperidinoethyl-, 12-(N'-methylpiperazino)propyl- and 12-morpholinoethyl - 10,5 - (iminomethano) - 10,11 - dihydro - 5H-dibenzo-[a,d]cyclohepten-13-one.

Alternatively, in the same manner as described in Example 2, but using ethyl, propyl, butyl, allyl, benzyl, β-phenethyl, trimethoxybenzyl, diisopropylaminopropyl, pyrrolidinoethyl, piperidinoethyl, (N'-methylpiperazino) propyl or morpholinoethyl, chloride or bromide respectively, instead of methyl iodide, the above compounds are also obtained.

EXAMPLE 6

12-dimethylaminopropyl-10,5-(iminomethano)-10,11-dihydro-5H-dibenzo[a,d]cyclohepten-13-one 10,5 - (iminomethano) - 10,11 - dihydro - 5H-dibenzo-[a,d]-cyclohepten-13-one, prepared as described in Example 4 (10.0 g.), is dissolved in dry dioxan (100 ml.), and then treated with sodium hydride suspension (1.95 g. of a 54% suspension). The mixture is refluxed for 30 minutes, cooled and then dimethylaminopropyl chloride (5.5 g.) is added dropwise. The mixture is refluxed and stirred overnight. The mixture is diluted with water and then evaporated to small volume. The residue is partitioned between ethyl acetate and water and the ethyl acetate phase is extracted thoroughly with dilute hydrochloric acid. The acid extracts are basified and then extracted with ether. The ethereal extracts are water-washed, dried and evaporated to yield the crude product (14.0 g.). This material is purified from benzene-hexane to give the title product with M.P. 117–119° C.

EXAMPLE 7

12-(β-N,N-diethylaminoethyl)-10,5-(iminomethano)-10,11-dihydro-5H-dibenzo[a,d]cyclohepten-13-one A mixture of 10,5-(iminomethano)-10,11-dihydro-5H-dibenzo[a,d]cyclohepten-13-one, prepared as described in Example 4 (1.18 g.), and sodium hydride suspension (240 mg. of a 54% suspension) in dry dioxan (30 ml.), is refluxed and stirred for 30 minutes. Then β-chloroethyldiethylamine (677 mg.) is added in a little dioxan and the mixture is refluxed for a further 3 hours.

The basic product is isolated as described in Example 3 and purified from benzene-hexane to give the title product of M.P. 102–104° C.

Alternatively, 11 - hydroxy - 12-diethylaminoethyl-10,5-(iminomethano) - 10,11 - dihydro - 5H - dibenzo[a,d] cyclohepten-13-one (5.0 g.), prepared as described in Example 3, is suspended in liquid ammonia and treated with sodium and then with ammonium chloride as described in Example 5. The solvent is evaporated and the residue is washed with water. The insoluble residue is crystallized from benzene-hexane to give the title product identical with that described above.

EXAMPLE 8

12-(dimethylaminoethyl)-10,5-)iminomethano)-10,11-dihydro-5H-dibenzo[a,d]cycloheptene-13-one A mixture of 10,5-(iminomethano)-10,11-dihydro-5H-dibenzo[a,d]cyclohepten-13-one, prepared as described in Example 4 (10.0 g.), and sodium hydride (1.92 g. of a 54% suspension) in dry dioxan (100 ml.), is refluxed and stirred for 1 hour. To the solution is added dropwise, a solution of dimethylaminoethyl chloride (15.0 g.), in dry ether (40 ml.), over a period of thirty minutes.

The mixture is refluxed overnight and evaporated to a small volume. The residue is diluted with water and the solids are collected and purified from benzene-hexane to give the title product with M.P. 165–168° C. The hydrochloride salt with M.P. 270–273° C. after crystallization from methanol is obtained by treating the above compound with methanolic hydrogen chloride.

We claim:
1. 10,5-(iminomethano)-10,11-dihydro-5H-dibenzo[a,d] cyclohepten-13-one.
2. 12 - methyl-10,5-(iminomethano)-10,11-dihydro-5H-dibenzo[a,d]cyclohepten-13-one.
3. 12-(β-N,N-diethylaminoethyl)-10,5-(aminomethano)-10,11-dihydro-5H-dibenzo[a,d]cyclohepten-13-one.
4. 12 - (dimethylaminoethyl)-10,5-(iminomethano)-10,11-dihydro-5H-dibenzo[a,d]cyclohepten-13-one.
5. The hydrochloride salt of 12-(dimethylaminoethyl)-10,5 - (iminomethano) - 10,11 - dihydro - 5H - dibenzo-[a,d]cyclohepten-13-one.
6. 12 - dimethylaminopropyl-10,5-(iminoethano)-10,11-dihydro-5H-dibenzo[a,d]cyclohepten-13-one.

References Cited

UNITED STATES PATENTS 3,412,085  11/1968  Dobson et al. _____ 260—239.3

HENRY R. JILES, Primary Examiner

R. T. BOND, Assistant Examiner

U.S. Cl. X.R.

424—244